United States Patent [19]

Chua et al.

[11] Patent Number: 4,752,540
[45] Date of Patent: Jun. 21, 1988

[54] POLYMERIC ENCLOSURES FOR NON-AQUEOUS ACTIVE METAL CELLS

[75] Inventors: David L. Chua, Wayne; William J. Eppley, Skippack, both of Pa.; Gerald F. Hoff, Columbia, Md.

[73] Assignee: Honeywell Inc., Minneapolis, Minn.

[21] Appl. No.: 58,296

[22] Filed: Jun. 5, 1987

[51] Int. Cl.$^4$ .............................................. H01M 2/02
[52] U.S. Cl. ...................................... 429/56; 429/176; 429/194
[58] Field of Search ................... 429/56, 53, 176, 163, 429/82, 194; 220/207, 89 A, 89 B, DIG. 14

[56] References Cited

U.S. PATENT DOCUMENTS

| | | | |
|---|---|---|---|
| 2,585,922 | 2/1952 | Ellis | 429/179 |
| 3,204,156 | 8/1965 | Moresi, Jr. et al. | 429/82 X |
| 3,384,514 | 5/1968 | Strobel et al. | 429/176 X |
| 3,738,860 | 6/1973 | Von Roda et al. | 429/163 X |
| 3,855,006 | 12/1974 | Kegelman | 429/82 |
| 4,175,166 | 11/1979 | Rosansky | 429/176 X |

*Primary Examiner*—Anthony Skapars
*Attorney, Agent, or Firm*—C. G. Mersereau

[57] ABSTRACT

A container for a non-aqueous electrochemical cell is molded from a partially hologenated alkaline polymer and has integral electrical leads and vents.

6 Claims, 2 Drawing Sheets

POLYMERIC ENCLOSURES FOR NON-AQUEOUS ACTIVE METAL CELLS

The Government has rights in this invention pursuant to Contract No. N60921-84-C-0010, awarded by the Department of the Navy.

BACKGROUND OF THE INVENTION

1. Field of the Invention

The invention relates to the field of non-aqueous active metal electrochemical cells and, more particularly, to chemically inert, non-conducting high strength polymeric enclosures for such cells.

2. Description of the Prior Art

Much work has been done in the field of high energy battery systems utilizing highly reactive anode materials such as alkali metals in combination with non-aqueous electrolytes. Generally, such electrolytes normally consist of a solute which is commonly a metal salt or complex metal salt of the anode metal, i.e., of group I-A, II-A or III-A elements of the Periodic Table, dissolved in a compatible non-aqueous solvent. Batteries, often comprised of a group of such cells, are used in applications which require them to provide a high output over a wide temperature range. The most widely used electrochemical system of such cells consists of a lithium anode, a salt of a cation of the lithium anode such as lithium aluminum chloride ($LiAlCl_4$) in a suitable solvent depolarizer such as thionyl chloride ($SOCl_2$) or sulfuryl chloride ($SO_2Cl_2$). The cathode is normally of carbon or a relatively inert carbonaceous material.

The highly reactive nature of the materials used in these cells has made it necessary to house the individual electrochemical cells in metal containers. The highly corrosive nature of these electrochemical materials has made it necessary for this metal to be stainless steel. Because of the possibility of high pressure build up in these cells under certain conditions, it is common practice to use a safety vent device welded into the metal cell case which allows gases and the electrolyte to be vented from the cell in a controlled manner in the event a predetermined pressure is exceeded.

In addition, the individual cells have heretofore required a glass-to-metal or ceramic-to-metal seal to effect electrical isolation of the primary lead. In lithium electrochemical cells, because of the high cell potential, the resistance of the glass or ceramic materials to electrochemcial and chemical corrosion has, in certain cases, been questionable with respect to extended periods of storability. In addition, to insure complete electrical isolation, potting techiques have commonly been used to isolate the battery "stack" of cells from the battery housing. This commonly interferes with the operation of the cell vent unless special design features are accommodated. Also, in the event of an electrochemical leakage from one or more of the cells of the battery, intercell current leakage can be established and cause battery self-discharge and even can create a safety hazard.

Thus, while cell electrochemistry has evolved and progressed relatively rapidly, cell enclosure technology has lagged behind. There has existed a definite need for a less expensive, chemically inert, strong, electrically insulating containing system for such cells which is less difficult to manufacture.

SUMMARY OF THE INVENTION

The present invention contemplates forming the container or housing for an active metal electrochemical cell of a polymeric material. The container or "cup" is strong and impact resistant, electrochemically and chemically inert to the reactive species of the active metal cell environment. It also possesses a moldability which significantly simplifies the complexities of fabrication of intricate designs involved when such enclosures are made of metal such as stainless steel. In addition, the electrical leads for this cell or for any necessary cell-to-cell interconnections can be molded in the housings with the proper protruding sections thereby eliminating the necessity for the use of glass-to-metal or ceramic-to-metal seals, long a problem with metal cells; and any required safety vent device can be molded integrally into the cup structure.

The polymer or plastic material from which the container or housing is fabricated is characterized by a variety of properties which enable it to accomplish the improvement of the present invention. It is a moldable, or otherwise workable material which can readily be formed into the desired shapes, is chemically inert both to the external environment and also to the chemical species within the cell. It must be a non-conductor of electricity and a material which can readily be sealed as by heat sealing or the like.

The preferred embodiment contemplates a cell housing structure of molded ethylene-tetrafluoroethylene (ETFE) copolymer in which necessary electrical leads for cell-to-cell or external connection, heat/pressure vents, electrolyte passage for reserve cells and other functional design features are integrated in a single, simple and inexpensive molding fabrication step. It is believed that other modified halogenated polymers and copolymers also might provide the requisite property parameters, but ETFE has held the most promise to date.

DESCRIPTION OF THE PREFERRED EMBODIMENT

Figure 1:
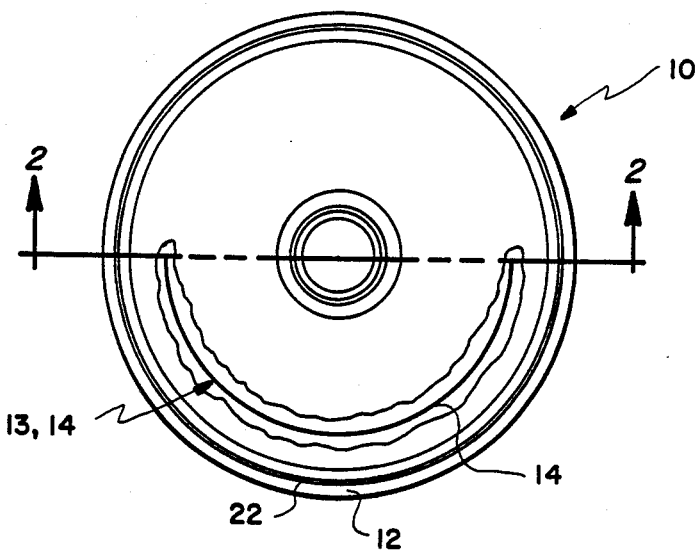
FIG. 1 is a top view with parts cut away of a typical closed molded cell in accordance with the invention.
Figure 2:
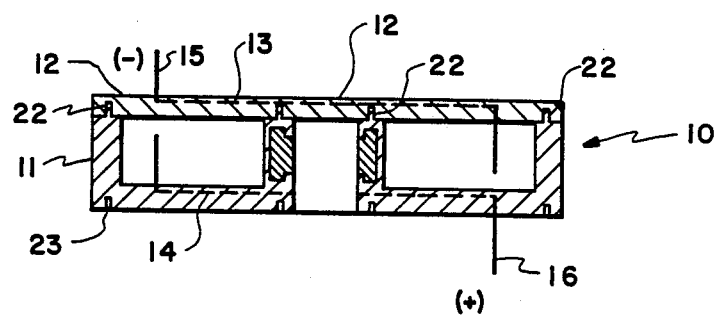
FIG. 2 is a sectional elevation view along line A—A of FIG. 1.

FIGS. 1 and 2 depict a cell housing in accordance with the invention. The cell housing designated generally at 10, is in the form of a toroidal cup 11 together with a cover member 12, electrical conductors in the form of wires 13 and 14, which may be stainless steel, are shown in the cut away section of FIG. 1 and further illustrated by vertical protruding segments in the form of negative lead 15 and positive lead 16 in FIG. 2. The semi-circular segments of the wires 13 and 14 in FIG. 1 are embedded horizontally in the top of cover member 12 and in the cup section 11 respectively with external lead extensions 15 and 16 protruding through the cover and cup as shown. The leads can be used to effect intercell connections as shown in FIG. 4, or as the terminals in a single cell environment.

Figure 3:
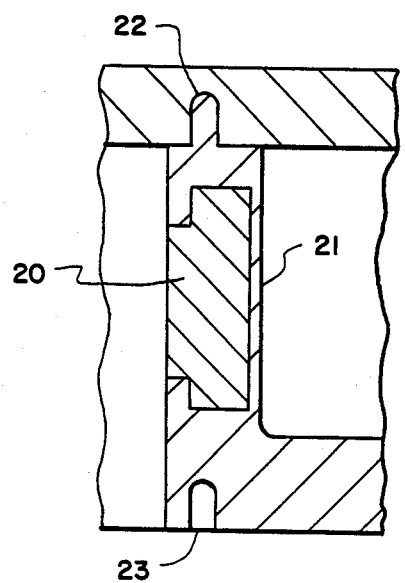
FIG. 3 is an enlarged fractional view encompassed by the dahsed line A in FIG. 2.

FIG. 3 is an enlarged view of a portion of the inner wall of the toroidal cup including part of the bottom which illustrates a venting system for the cell. The venting system has a heat activated member 20 which may be a short section of low melting alloy, or the member may extend around the girth of the inner toroidal wall. The presence of the member 20 creates a very thin, diaphragm-like portion in the inner toroidal wall of the molded structure at that location as shown at 21. Heat or pressure activated vents are used because most problems associated with active metal cells which produce a condition which requires venting cause the cell to overheat. This, in turn, produces a pressure build up within the cell. The material of the member 20 is selected to melt at a temperature below that at which the pressure build up becomes dangerous. One such material is a binary lead-bismith alloy (Pb-B's) which melts at about 125° C. After the material of the member 20 reaches its melting point and loses all mechanical strength, internal cell pressure is contained solely by the thin polymer diaphragm like section 21; and, in the event a safe pressure is exceeded, the diaphragm 21 will rupture, thereby venting the cell.

Figure 4:
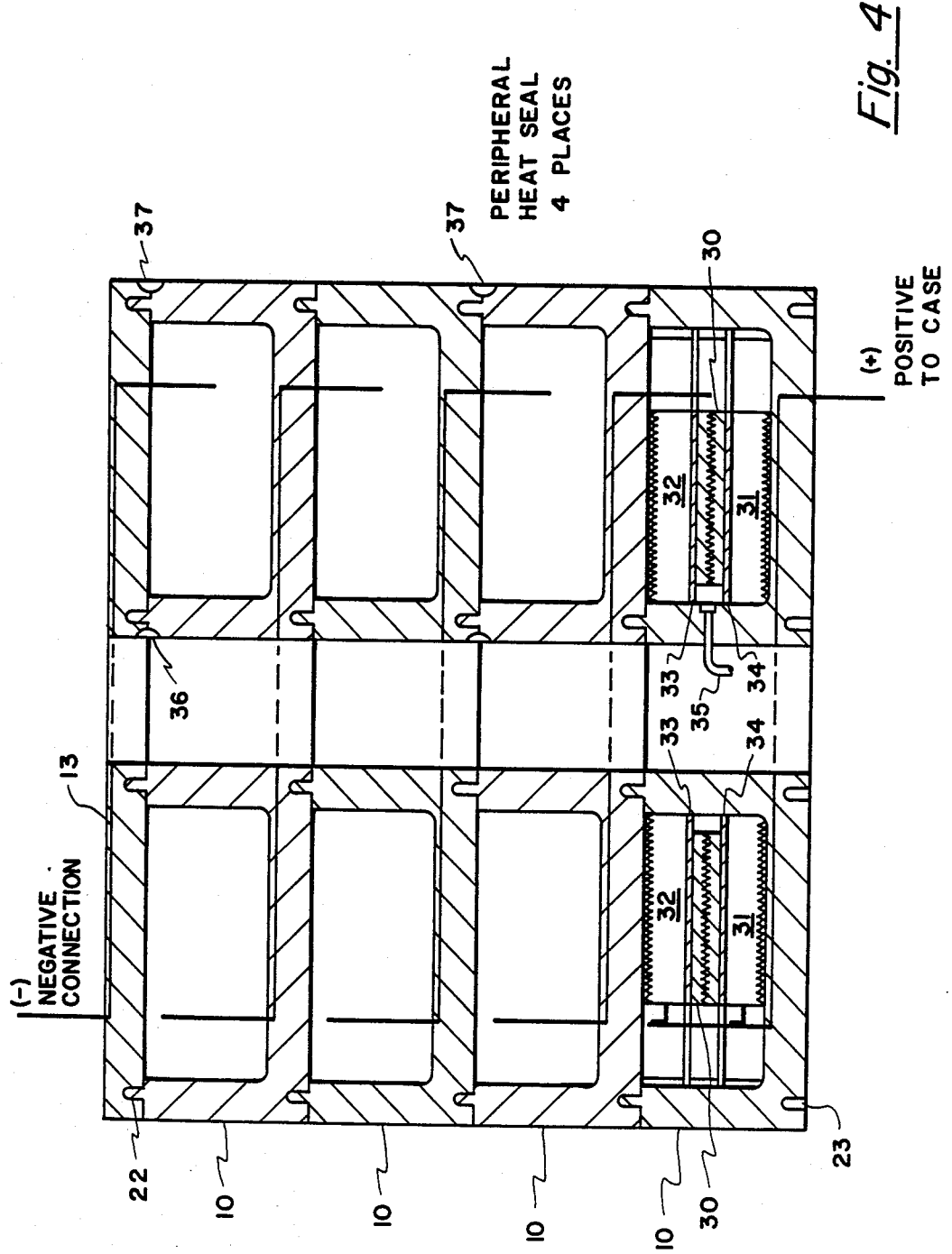
FIG. 4 is a crosssectional view of a battery assembly in patent detail using a plurality of the cells depicted in FIGS. 1–3.

The cover sections may be conveniently attached as by heat sealing the interface and the cells may be conveniently stacked using tabs 22 and corresponding recesses 23 as shown in FIG. 4.

FIG. 4 illustrates a reserve battery which includes four (4) cells in accordance with FIGS. 1-3 stacked and connected in series. In as much the internal workings of all of the cells are identical, but one cell in the battery is depicted in detail. Each cell includes an active metal anode 30, normally a film or wire of lithium, flanked by a pair of cathodes 31 and 32, normally of carbon black. Each anode is physically separated from the respective cathode pair by a pair of separaters 33 and 34 in a well-known manner. When the cell is activated, normally by external means, separately stored electrolyte is admitted to each of the cells as through a tube such as 35.

It is noteworthy that the integral molding of wire 13 and 14 simplifies not only single cell connections, but also greatly simplifies intercell connection as FIG. 4 illustrate's. Of course, the cells can be connected either in series or parallel and such will occur to those skilled in the art.

In a multi-cell battery, the cells are normally heat sealed about their perpheral juxtaposed interfaces about the inside and outside of the torus and between the top cell and its cover. This shown in FIG. 4 between at, 36 and 37. This insures intercell system integrety subject only to possible venting in extreme circumstances.

The housing toroidal cup or cover can be molded as a one piece polymer extrusion with the low temperature melting vent material and necessary wires embedded in the molded polymeric material as desired. This is certainly far simpler than the complicated fabrication and assembly required to make the stainless steel housings of the prior art. The use of the lead wires made in and protruding directly from the non-conducting polymeric material also eliminates the need for the expensive glass or ceramic-to-metal seals and the implanted melting vent members eliminate the complicated venting systems associated with the cells of the prior art.

While other materials having similar properties that will work successfully, the preferred material for constructing the cell housing in accordance with the present invention is an ethylene-tetrafluoroethylene (ETFE) copolymer which is normally a predominately 1:1 alternating copolymer made by copolymerizing ethylene and tetrafluoroethylene. Its moldecular structure generally consists of linear chains with $CH_2$—$CH_2$—$CF_2$—$CF_2$ as the primary or backbone repeating unit. The copolymer melts at about 270 degrees C. and has a density of about 1.7 g/cc. Generally, ETFE is a strong, highly impact-resistant material with good chemical resistance, electrical insulating properties and environmental weathering resistance. One advantage it has over fully fluorinated or fully chlorinated polymers is that it is chemically and electorchemically inert to the alkali metal containing constituents of active metal cells such as lithium and lithium salts which may react with polytetrafluorethylene (PTFE), polyvinyl chloride (PVC), etc. The material is not soluble in most or all common solvents yet can be processed by conventional thermoplastic techniques. The material has excellent injection molding, blow molding and extrusion characteristics and can be readily melt processed. At least one form of the material is sold under the trademark Tefzel which belongs to E. I. DuPont de Neumers of Wilmington, Del.

From the above it is apparent that the present invention greatly simplifies the fabrication and reduces the cost of manufacturing housings or containers for active metal, non-aqueous cells. This is accomplished without sacrificing safety, quality of electrical connections or cell performance. This invention represents an important advance in the art of packaging these extremely important electrochemical couples.

What is claimed is:

1. A non-aqueous electrochemical cell including a polymeric container having an active metal anode, an electrolyte comprising an oxyhalide solvent/depolarizer containing a salt of a cation of the anode metal and an inert cathode, said container consisting essentially of polymer material selected from the group consisting of partially halogenated alkene polymers and copolymers.

2. The cell of claim 1 wherein said active metal anode is lithium and said polymer material consists essentially of ethylenetetrafluroroethylene copolymer.

3. The cell of claim 2 wherein said polymer material is formed by molding.

4. The cell of claim 3 including electrical leads integrally molded therein.

5. The cell of claim 3 including integral venting means to vent said container upon reaching a predetermined temperature and pressure.

6. The cell of claim 5 wherein said vent means further comprises an amount of metal material having a melting point just below said predetermined temperature imbedded in a wall of said container such that when said metal material melts, the effective thickness of said wall is reduced to a thickness which readily ruptures at the internal container pressure associated with that temperature.

* * * * *